(12) United States Patent
Schönfeldt et al.

(10) Patent No.: US 11,545,272 B2
(45) Date of Patent: **\*Jan. 3, 2023**

(54) STRUCTURAL MATERIAL FOR MOLTEN SALT REACTORS

(71) Applicant: Seaborg ApS, Copenhagen N (DK)

(72) Inventors: Troels Schönfeldt, Copenhagen NV (DK); Jimmy Sølvsteen Nielsen, Gundsølille (DK); Eirik Eide Pettersen, Copenhagen S (DK); Andreas Vigand Pedersen, Copenhagen Ø (DK); Daniel John Cooper, Copenhagen Ø (DK); Ask Emil Løvshall-Jensen, Brønshøj (DK)

(73) Assignee: SEABORG APS, Copenhagen N (DK)

( \* ) Notice: Subject to any disclaimer, the term of this patent is extended or adjusted under 35 U.S.C. 154(b) by 0 days.

This patent is subject to a terminal disclaimer.

(21) Appl. No.: 17/427,050

(22) PCT Filed: Jan. 31, 2020

(86) PCT No.: PCT/EP2020/052376
§ 371 (c)(1),
(2) Date: Jul. 29, 2021

(87) PCT Pub. No.: WO2020/157247
PCT Pub. Date: Aug. 6, 2020

(65) Prior Publication Data
US 2022/0028569 A1   Jan. 27, 2022

(30) Foreign Application Priority Data

Jan. 31, 2019 (EP) .................................... 19154831

(51) Int. Cl.
*G21C 3/07* (2006.01)
*G21C 3/54* (2006.01)
(Continued)

(52) U.S. Cl.
CPC ................. *G21C 3/07* (2013.01); *G21C 1/22* (2013.01); *G21C 3/24* (2013.01); *G21C 3/54* (2013.01); *G21C 5/12* (2013.01)

(58) Field of Classification Search
CPC ... G21C 1/22; G21C 3/07; G21C 3/24; G21C 3/54; G21C 5/12
See application file for complete search history.

(56) References Cited

U.S. PATENT DOCUMENTS

| 9,418,765 B2 \* | 8/2016 | Lounsbury ............. G21C 3/322 |
| 2009/0279658 A1 \* | 11/2009 | Leblanc .................... G21C 3/22 |
| | | 376/360 |

(Continued)

FOREIGN PATENT DOCUMENTS

| CN | 104637551 A | 5/2015 |
| GB | 2508537 A | 6/2014 |

(Continued)

OTHER PUBLICATIONS

E. Teeter et al.; "The Catalog of nuclear reactor concepts", Argonne National Library, USA,1965. (Year: 1965).\*

(Continued)

*Primary Examiner* — Sharon M Davis
(74) *Attorney, Agent, or Firm* — Fox Rothschild LLP; Carol Thorstad-Forsyth (57) ABSTRACT

The present invention relates to a device adapted for producing energy by nuclear fission, the device comprising a core container of a core container material, which core container encloses an inner tubing of an inner tubing material, the inner tubing and/or the core container having an inlet and an outlet, the device further comprising a molten halide salt located in the core container or in the inner tubing, wherein the inner tubing comprises one or more (Continued)

sections consisting of single crystal corundum. The invention further relates to methods of controlling nuclear fission processes using the device and to the use of a corundum tube as a structural material in a nuclear fission device. The invention provides improved economy in molten salt nuclear fission processes.

31 Claims, 6 Drawing Sheets

(51) Int. Cl.
*G21C 1/22* (2006.01)
*G21C 3/24* (2006.01)
*G21C 5/12* (2006.01)

(56) References Cited

U.S. PATENT DOCUMENTS

| | | | |
|---|---|---|---|
| 2010/0206725 A1 | 8/2010 | Zhang et al. | |
| 2013/0083878 A1* | 4/2013 | Massie | G21C 19/48 376/110 |
| 2015/0243376 A1 | 8/2015 | Wilson | |
| 2016/0005497 A1 | 1/2016 | Scott | |
| 2018/0075931 A1 | 3/2018 | Arafat et al. | |
| 2018/0322964 A1 | 11/2018 | Leblanc | |
| 2019/0057783 A1 | 2/2019 | Leblanc | |
| 2020/0048790 A1 | 2/2020 | Sakano et al. | |

FOREIGN PATENT DOCUMENTS

| | | |
|---|---|---|
| WO | 2013116942 A1 | 8/2013 |
| WO | 2017060741 A1 | 4/2017 |
| WO | 2018181981 A1 | 10/2018 |
| WO | 2018229265 A1 | 12/2018 |

OTHER PUBLICATIONS

International Search Report issued in PCT/EP2020/052376 dated Mar. 25, 2020.
Single Crystal Sapphire, 2018, Kyocera Corporation, 006/013/1804.
EFGTM Sapphire Tubes, Saint-Gobain Ceramics & Plastics, Inc., 2006-2016.
C.E. Teeter et al.: "The Catalog of nuclear reactor concepts", Argonne National Library, USA, 1965.
G.P. Smith: "Corrosion of materials in fused hydroxides", Oak Ridge National Laboratory, USA, 1956.
Williams et al., "The Reactions of Molten Sodium Hydroxide with Various Metals" 1956, Naval Research Laboratory, 78: 5150-5155.
J. Goret and B. Trémillon, Electrochim. Acta. 12 (1967) 1065-1083.
International Search Report dated Jul. 19, 2018 in PCT/EP2018/065989 filed Jun. 15, 2018.
Delpech, S., Cabet, C., Slim, C., and Picard, G. S. (2010). Molten fluorides for nuclear applications. Materials Today, 13(12), 34-41. 2010.
Ho, M. K. M., Yeoh, G. H., and Braoudakis, G. (2013). Molten salt reactors. Materials and Processes for Energy, Formatex, 761-768. 2013.
Chemistry in Non-Aqueous Solvents, B. Tremillon, 1874, p. 194-195.
ORNL Aircraft Nuclear Power Plant Designs, 1954 (ORNL-1721).
Gibilaro et al. "A Way to Limit the Corosion in the Molten Salt Reactor Concept: The Salt Redox Potential Control." (2015) Electrochimisa Acta, 160. 209-213. ISSN 0013-4686.
"An Advanced Molten Salt Reactor Using High-Temperature Reactor Technology", Proceedings of ICAPP '04, Pittsburgh, PA USA, Jun. 13-17, 2004, Paper 4152 (Introduction).
"Validation of Actinide Fluoride Simulators for Studying Solubility in Fuel Salt of Molten-Salt Reactors", Atomic Energy, vol. 112, No. 6, Oct. 2012 (Russian Original vol. 112, No. 6, Jun. 2012).
Written Opinion issued in Singapore application No. 11202107389OX dated Aug. 8, 2022.

* cited by examiner

STRUCTURAL MATERIAL FOR MOLTEN SALT REACTORS

CROSS-REFERENCE TO RELATED APPLICATIONS

The present application is a U.S. National Phase of International Patent Application No. PCT/EP2020/052376 which was filed on Jan. 31, 2020 and which claims priority to European Patent Application No. 19154831.2 filed on Jan. 31, 2019. The contents of the listed patent documents are incorporated herein by reference in their entireties.

The present invention relates to molten salt reactors (MSR) for nuclear fission reactions. In particular, the present invention relates to structural materials that are useful in both fast reactors where no moderator is used and in thermal or epi-thermal reactors that employ a moderator.

PRIOR ART

Nuclear fission produces energetic neutrons typically at an energy range from 100 keV to 2 MeV. The probability of a fission event occurring depends on the neutron energy. In a so-called fast reactor, the unmoderated neutrons produced from fission interact directly with other nuclei. Thermal and epi-thermal nuclear fission reactors rely on moderators to reduce the energy to increase fission probability. Nuclear fission reactors thus can be operated by two different principles, namely fast reactors and thermal and epi-thermal reactors.

In a fast reactor, the energetic neutrons interact directly with fissile material to produce energy, fission products and energetic neutrons.

In thermal and epi-thermal reactors, the energetic neutrons produced by fission exchange energy with a moderator and eventually interact with fissile material to produce energy, fission products and more energetic neutrons.

Regardless of the design choices made related to the fuel in a thermal or epi-thermal reactor, a suitable moderator material should generally offer a number of characteristics for the interaction between neutrons and fissile atoms. The moderator should present high probability of interaction by scattering, which equates to a short mean free path of the neutrons between interactions, and influences the size of the moderator and reactor core. The moderator should further consist of light-weight moderator atoms; in a scattering event the neutrons transfer energy to the moderating material and are slowed down. The lighter the atom the more energy is transferred per interaction. The moderator should present low probability of neutron absorption. Absorption in the moderator decreases the neutron flux available for fission, and increases the severity of activation of materials. Thus, it is typically favourable to have low absorption in the moderator.

Table 1 below summarises moderating properties of various moderator materials. $\zeta$ is the average number of scattering events necessary to reduce the energetic neutrons to thermal energy levels, MFP is the mean free path for elastic scattering measured in cm, and $\Sigma_{abs}$ is a measure of the number of neutrons absorbed per meter.

TABLE 1

Moderating effect of various prior art moderator materials.

| Material | $\zeta$ [#] | $mFP_{ela}$ [cm] | $\Sigma_{abs}$ [1/m] | Comment |
|---|---|---|---|---|
| $H_2O$ (liq) | 24.8 | 0.66 | 2.226 | Very compact |
| $D_2O$ (liq) | 33.4 | 2.77 | 0.001 | Exceptional moderator, not compact |
| C (graphite) | 110.9 | 2.50 | 0.030 | Exceptional moderator, not compact |
| $CH_2$ (polyethylene) | 24.3 | 0.56 | 2.589 | Very compact (Not suitable for high temperature conditions) |
| $^7Li$ | 67.2 | 22.15 | 0.207 | Unsuited due to moderator size |
| 2 $^7LiF$:1 $BeF_2$ | 25.9 | 2.97 | 0.201 | Very good but expensive and difficult to enrich $^7Li$ |
| $^{23}Na$ | 207.1 | 11.86 | 1.346 | Not moderating |
| Be | 84.7 | 1.29 | 0.094 | Exceptional moderator, expensive |
| MgO ceramic | 174.7 | 2.53 | 0.339 | Not moderating |

Thus, water ($H_2O$) is a very compact moderator, and deuterated water ($D_2O$), beryllium (Be) and graphite (C) are formally exceptionally good moderators in terms of low neutron absorption. Neither are immediately appropriate in MSRs and more appropriate moderation for a MSR is disclosed in WO 2018/229265. Moderation in a MSR using graphite is disclosed in WO 2013/116942. The aim of WO 2013/116942 is the integration of the primary functional elements of graphite moderator and reactor vessel and/or primary heat exchangers and/or control rods into a single replaceable unit having a higher and more economic power density while retaining the advantages of a sealed unit.

MSRs are based on a critical concentration of a fissile material dissolved in a molten salt. The molten salts may have a base of $^7LiF$ with a content of fluoride salts of fissile elements and other components, e.g. for moderated reactors. This is commonly referred to as the fuel salt. MSRs were researched into at i.a. the Oak Ridge National Laboratory in the 1950's and 1960's but have never been successfully commercialised. MSRs have several advantages over other reactor types, including those being in commercial use nowadays. MSRs are capable of producing much lower levels of transuranic actinide waste than uranium/plutonium reactors, of operating at high temperatures, of avoiding accumulation of volatile radioactive fission products in solid fuel rods and of combusting greater amounts of fissile material than is possible in conventional reactors.

Several disadvantages encountered in the 1950's and 1960's caused MSRs to not be commercialised. One disadvantage contributing to MSRs never having been commercialised lies in that insoluble fission products would foul pumps and heat exchangers of the MSR. Most exploited designs of molten salt reactors therefore require attached reprocessing plants to continually remove fission products from the fuel salt. This in turn renders the MSRs complex, expensive, and requiring extensive development work.

For at least the above-mentioned reasons, research in molten salt reactors was generally abandoned in the late 1960's in favour of sodium fast reactors or traditional fission reactors of the type being in common use to this day. A heat pipe cooled molten salt fast reactor with a stagnant liquid core is disclosed in US 2018/075931.

An important disadvantage is that molten salts are generally highly corrosive. This has caused extensive research into development of corrosion-resistant metal alloys. While some suitable metal alloys, such as Nickel based superalloys, have in fact been developed, these alloys are extremely expensive and corrosion would nevertheless typically still occur after long time periods.

New composite materials based on carbon and/or carbides, e.g. silicon carbide have, in principle, the chemical resistance to withstand the molten salt, but building complex structures from such materials is both very challenging and very expensive.

Structural materials (including cladding) play an essential role for keeping different reactor core components from contacting or mixing. One example is the zirconium alloy tubing containing fuel pellets or fuel rods. Such materials need to be able to withstand the hostile conditions inside the reactor core. Cladding materials must have a number of material performance characteristics including corrosion resistance, high melting temperature, chemical inertness at high temperatures, resistance to various mechanical stress scenarios, radiation damage (indicated using the unit DPA—Displacements per Atom), and thermal stresses under various scenarios—all this while not compromising the reactor neutron economy.

Metals promising in regard to resistance to corrosion have been found often to perform poorly in terms of neutron economy (neutrons are absorbed in the structural material resulting in loss of neutrons and alteration in the structure). Metal tubing of the Nickel based Hastelloy type have been proposed for a suitable construction material but challenges with regards to, amongst other things, inter-granular cracking and corrosion, have remained an issue.

The use of a molten phase for both the fissionable material and the moderator/coolant phase is a relatively new technique, see for example WO 2018/229265. While WO 2018/229265 suggests a solution to address problems with corrosion in MSRs, the solution is directed at an MSR using a moderator. There is an unmet need to provide further solutions to the problems relating to corrosion caused by the molten salts. The present invention aims to address this need.

SUMMARY OF THE INVENTION

The present invention relates to a device adapted for producing energy by nuclear fission, the device comprising a core container of a core container material, which core container encloses an inner tubing of an inner tubing material, the inner tubing and/or the core container having an inlet and an outlet, the device further comprising a molten halide salt located in the core container or in the inner tubing, wherein the inner tubing comprises one or more sections consisting of single crystal corundum. The inner tubing material thus comprises single crystal corundum but may also comprise other materials.

In the context of the invention a "structural material" is a material that will be in direct contact with a molten salt when a nuclear fission reaction takes place in the device. The device of the invention may also be referred to as a "molten salt reactor" (MSR). The molten halide salt may be a molten fuel salt. The molten halide salt can be located in the core container or in the inner tubing so that the molten halide salt will be in direct contact with the inner tubing material, i.e. at the "outer surface" of the inner tubing material when the molten halide salt is located in the core container or at the "inner surface" of the inner tubing when the molten halide salt is located in the inner tubing. The other surface of the inner tubing than the surface in contact with the molten halide salt may be in direct contact with another molten salt, e.g. a coolant salt, a molten moderator salt, or a breeder material. In an embodiment the inner tubing contains the molten fuel salt, but no molten salt is present at the outer surface of the inner tubing.

The inner tubing material comprises corundum, e.g. as a structural material. Corundum is a crystalline form of aluminium oxide ($Al_2O_3$) but in the context of the invention, the corundum may also contain traces of other elements and still be considered corundum. In the context of the invention, corundum is to be understood as single crystal corundum, even when this is not explicitly mentioned. Thus, "corundum" and "single crystal corundum" may be used interchangeably. The corundum may also be doped (e.g. with a transition metal, such as chromium, iron, vanadium, beryllium, or titanium, or a combination of these). Undoped, the corundum is commonly known as sapphire. Doped with chromium, the corundum is commonly known as ruby. Other additions or impurities could be known as yellow sapphire. The corundum may be a single crystal. Crystalline ruby is generally harder than undoped corundum, which is advantageous for a structural material in an MSR.

Corundum is available in the form of tubes or sheets, e.g. from Kyocera Corporation, Kyoto, Japan (see the brochure "Single Crystal Sapphire", 2018 KYOCERA CORPORATION, 006/013/1804), or Saint-Gobain Ceramic Materials, Courbevoie, France, (see the brochure "EFG™ Sapphire Tubes", Saint-Gobain Ceramics & Plastics, Inc., 2006-2016).

Corundum is generally prepared from a molten aluminium oxide where the single crystal can be "pulled" from the melt using an initial, small single crystal to pull a larger crystal. The corundum may be produced using any available method, and the shape of the corundum material may be chosen freely.

The device of the invention has a molten halide salt. The molten halide salt may be a fuel salt, for example a halide salt of a fissionable actinide, but the device may also comprise a molten moderator salt and further molten salts having different functions. The device may, for example, comprise a molten coolant salt. The fuel salts may have any appropriate composition but will generally contain halide ions, e.g. fluoride or chloride ions. The fuel salt will normally contain either fluoride or chloride ions, however the combinations of fluoride and chloride ions in a fuel salt is also contemplated. Further halides, e.g. bromide and iodide, may also occur in the fuel salt, typically as degradation products from the nuclear fission. The fuel salt used in the device may thus comprise a fluoride salt of a fissionable actinide. Alternatively, the fuel salt used in the device may thus comprise a chloride salt of a fissionable actinide. For example, the anionic component of the fuel salt, e.g. the fuel salt as added to the device, may be fluoride ($F^-$), e.g. no other anionic components except for unavoidable impurities than fluoride are present in the fuel salt. A fuel salt containing $F^-$ as the anionic component is typically used when the MSR contains a moderator, e.g. a molten moderator salt or solid graphite. Likewise, the anionic component of the fuel salt, e.g. the fuel salt as added to the device, may be chloride ($Cl^-$), e.g. no other anionic components except for unavoidable impurities than chloride are present in the fuel salt. A fuel salt containing $Cl^-$ as the anionic component is typically used when the MSR does not contain a moderator, e.g. when the MSR is a fast MSR.

Any appropriate fuel salt composition may be used in the present invention. For example, the fuel salt may comprise a fluoride salt or chloride salt of a fissionable actinide. The molten fuel salt may comprise any fissionable element, e.g. a fissile actinide, or elements that may be converted to fissile elements, e.g. thorium. In an embodiment the fuel salt has a base of fluorides of alkali metals, e.g. lithium, thorium and a fissile element, e.g. $^7$LiF with a content of fluoride salts of fissile elements and thorium, and optionally other components. The fuel salt preferably has a eutectic composition, e.g. a base of 78 molar percent $^7$LiF and 22 molar percent ThF$_4$ supplemented with actinide salts of the composition LiFAnF$_n$ where An is a fissile actinide, and n is 3 or 4. Other eutectic fluoride salt compositions are also relevant for the invention. For example, the salt known as FLiNaK (i.e. LiF—NaF—KF at 46.5-11.5-42 mol %, respectively) may be used as a coolant salt.

Molten halide salts are generally considered to be extremely corrosive, and molten halides are thus used in various industrial processes that utilise the corrosive nature. For example, aluminium oxide (Al$_2$O$_3$) is used as a starting material in the manufacture of metallic aluminium where Al$_2$O$_3$ is dissolved in molten cryolite (Na$_3$AlF$_6$) and metallic aluminium is obtained by electrolysis of aluminium ions. Cryolite is considered to dissociate into i.a. NaF$_2$ and NaAlF$_4$ at high temperature where especially the formed fluoride ions are thought to aid in dissolution of Al$_2$O$_3$. Similar observations are considered relevant for other halides, e.g. chloride ions. The present inventors have now surprisingly found that single crystal corundum is stable in the molten fuel salt containing fluoride ions, even when fluoride is the only anion present. The stability of single crystal corundum in molten halide salt, especially molten fluoride salts, allows that the neutron transparency of single crystal corundum is utilised in nuclear fission reactions in an MSR. This in turn provides a more compact MSR for producing energy by nuclear fission is obtained, and also that a much improved process economy is achieved. Therefore, corundum, i.e. a form of Al$_2$O$_3$, can be used as a structural material for a device adapted for producing energy by nuclear fission. Specifically, a sample of single crystal corundum was added to a molten FLiNaK salt at 600° C. and kept in the molten salt for 25 hours. Upon removal and cleaning of the sample a weight gain of 0.001 g was observed. Thus, no degradation of the single crystal corundum sample was observed, which shows that corundum can be exposed to a molten fuel salt with fluoride ions for extended periods of time, e.g. for periods of time relevant to the operation of an MSR for a nuclear fission reaction. Moreover, the serial number engraved into the side of the sample was still clearly visible after 25 hours in the molten FLiNaK (see FIG. 1), which emphasises that no signs of corrosion or dissolved material were visible. In particular, the engraved serial number represented a complex structure of a relatively large surface area where degradation would be visible as blurring of the serial number.

Due to the differences in neutron transparency of corundum compared to typical nickel based superalloys, using corundum as a structural material allows a much improved economy to be achieved in a device of the invention compared to a device of the prior art employing e.g. Hastelloy as a structural material. Table 2 shows the results for enrichment (E %) and conversion ratios (CR) for a MSR based on Hastelloy N compared to a device of the invention. In both cases the results are for an inner tubing with a thickness of 2 mm.

TABLE 2

Cost model for enrichment of $^{235}$U.

| | | Enrichment (E %) | Conversion ratio (CR) | Estimated fuel cost (Mio Euro) |
|---|---|---|---|---|
| FNaK | Hastelloy N | 6.0% | 0.46 | 47.0 |
| | Al$_2$O$_3$ | 3.5% | 0.58 | 28.6 |
| | Δ | −2.5% | 0.12 | −18.4 |
| FLiBe | Hastelloy N | 6% | 0.43 | 34.6 |
| | Al$_2$O$_3$ | 2.4% | 0.58 | 16.9 |
| | Δ | −3.6% | 0.15 | −17.7 |

Figure 2:
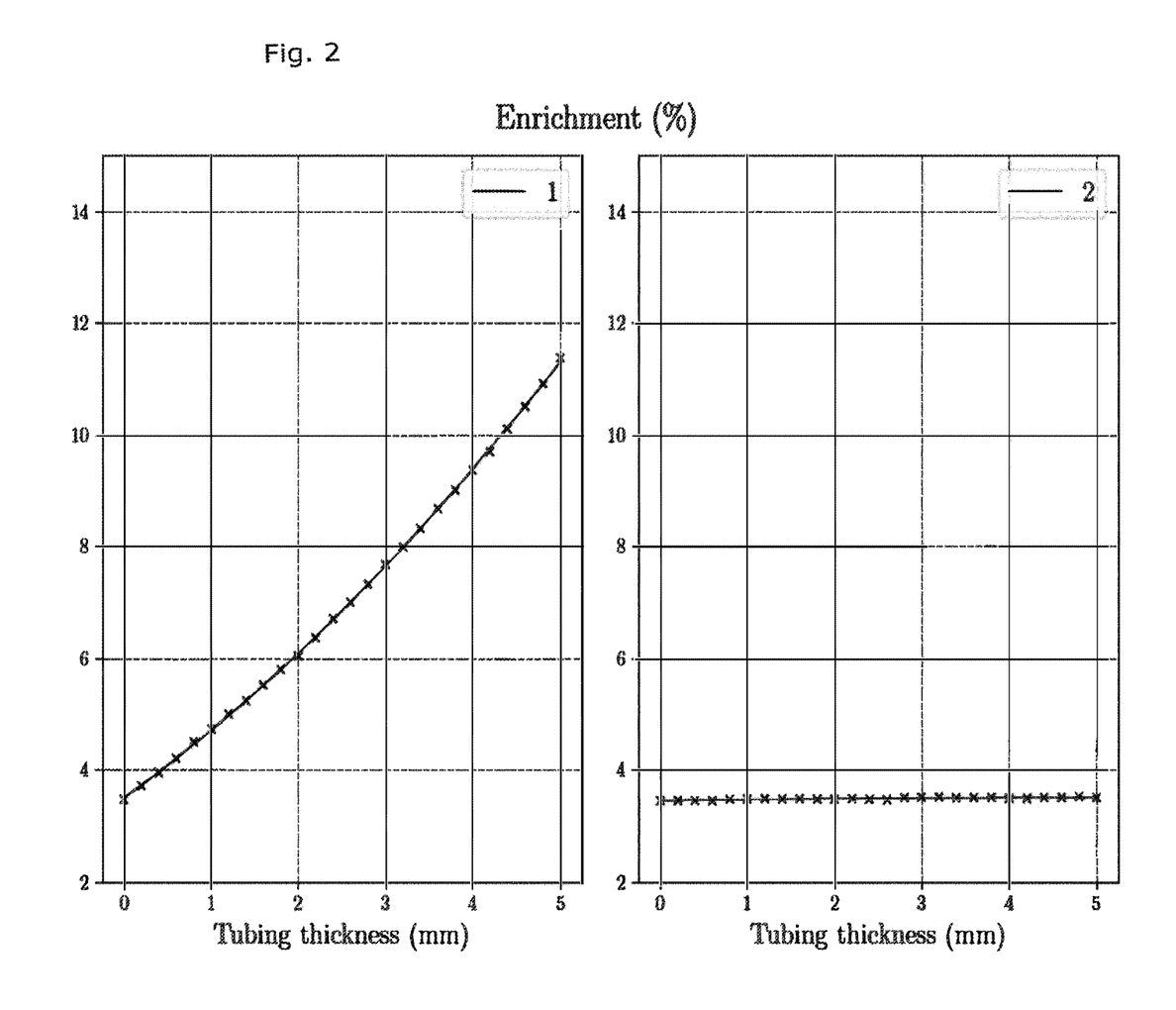
FIG. 2 shows the enrichment vs. inner tubing thickness in a device of the invention and a MSR of the prior art.
Figure 3:
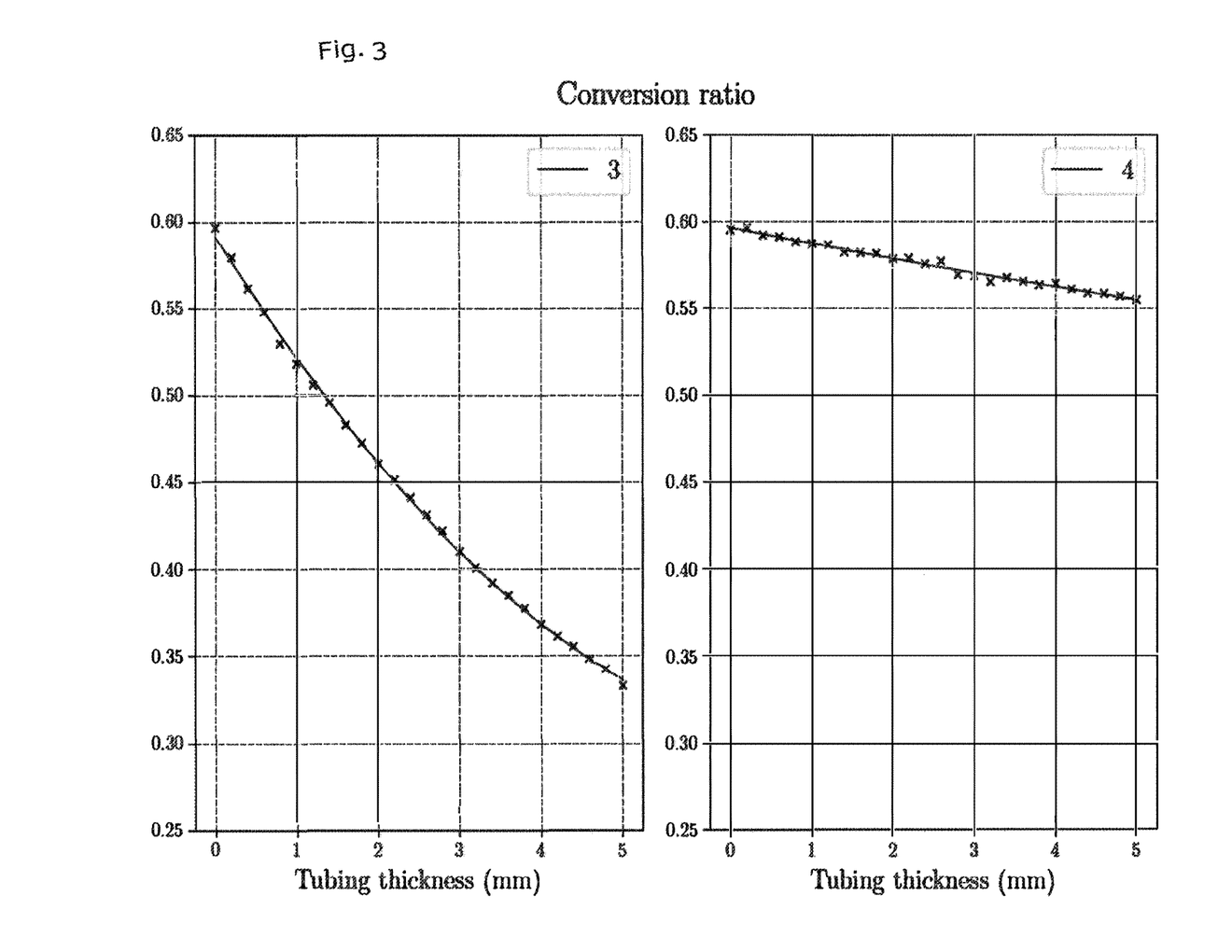
FIG. 3 shows the conversion ratio vs. inner tubing thickness in a device of the invention and a MSR of the prior art.

In Table 2, ΔE % is the change in enrichment going from Hastelloy N to Al$_2$O$_3$, and ΔCR is the change in conversion ratio going from Hastelloy N to Al$_2$O$_3$. An increase in CR equates a higher conversion and therefore more conversion of fissionable material into fissile material over the lifetime of the reactor. Evidently, the estimated fuel cost is a function of both the enrichment % needed and the conversion ratio, show that all three parameters favour the use of corundum to Hastelloy N. Data for E % and CR for the two reactor types as a function of inner tubing thickness are depicted in FIG. 2 and FIG. 3, respectively. Using corundum further allows that the inner tubing material can be made thicker without observing pronounced detrimental effects due to the thickness (e.g. both curves are "flat"), which is in contrast to the prior art device employing Hasteelloy N, where there is a strong negative effect of increasing the inner tubing thickness. By increasing the inner tube thickness the lifetime of the MSR is increased, which is reflected directly in the economy. Thus, the corundum provides an economically improved MSR.

In another aspect, the invention relates to the use of a single crystal corundum tube as a structural material in a device adapted for producing energy by nuclear fission wherein a molten halide salt, e.g. a fluoride salt, is in contact with the single crystal corundum tube. For example, the molten halide salt may be a molten fuel salt comprising a halide salt of a fissionable actinide. Any fuel salt described for the device aspect is appropriate for the use aspect. In particular, the fuel salt may comprise F$^-$ or Cl$^-$ as the only anionic component. Any advantage described for the device aspect will be equally relevant for the use aspect. In a particular embodiment, the molten fuel salt is contained in the corundum tube. In another embodiment, the molten fuel salt is in contact with an outer surface of the corundum tube.

The fuel salt may be described in terms of a fuel content. In the context of the invention the "fuel content" is the cation molar fraction, expressed with the unit "cmol %", of the fissile actinide fraction, i.e. the sum of the fissile actinides, e.g. $^{233}$U, $^{235}$U, $^{239}$Pu and $^{241}$Pu, divided by the sum of all the actinides of the fuel salt. Thus, the fuel salt may be represented with the equation:

Fuel salt=$a$ NaF+$b$ AnF$_4$ where Na represents any alkali metal and An represents one or more actinides; for a=22% and b=78% the mixture is eutectic. Specifically, An of AnF$_4$ may comprise both thorium and fissile elements where the molar content of the fissile elements, in particular $^{233}$U, $^{235}$U, $^{239}$Pu and $^{241}$Pu, is the fuel content and preferably is in the range of 2 cmol % to 10 cmol % of the actinides, i.e. An. Earth alkali metals may also be contained in the fuel salt. An example of a specific fuel salt composition is LiF—BeF$_2$—UF$_4$ (FLiBe—U).

The fuel salt may comprise thorium, so that neutrons produced during fission of fissile actinides, e.g. $^{233}$U, $^{235}$U and $^{239}$Pu, will convert non-fissile $^{232}$Th to fissile $^{233}$U. When the term "fuel content" is used this generally refers to the composition when the fission reaction is initiated. The improved corrosion resistance provided by the corundum allows a longer lifetime of the device so that a feasible thorium-based nuclear reactor is provided by the invention. Without the corrosion resistance, the molten salt is expected to degrade the device before operation based on generated $^{233}$U is possible.

The fuel salt of the device comprises a fissionable material. In the context of the invention a "fissionable material" is a material that can undergo fission from neutrons. As such, fissionable materials include isotopes that can undergo fission from thermal-energy neutrons, i.e. "fissile material", as well as isotopes that can only undergo fission from fast-energy neutrons. In the context of the invention, fissionable material also includes isotopes that can be converted, e.g. by absorption of a neutron, to a fissile material, i.e. "fertile material". Thus for example, $^{235}$U and $^{239}$Pu are fissile materials, and $^{232}$Th and $^{238}$U are fertile materials, and $^{232}$Th, $^{233}$U, $^{235}$U, $^{239}$Pu, and $^{238}$U are fissionable materials.

The inner tubing may have any shape desired. In general, the inner tubing has a circular cross-section, although the cross-section is not limited to circular and other cross-sectional shapes may be used. For example, the cross-section may be polygonal, rectangular, elliptical or of another shape. The internal tube may have a cross-sectional dimension, e.g. a diameter, in the range of 1 mm to 20 mm. The material thickness of the inner tubing material may be chosen freely, but it may for example be in the range of 1 mm to 10 mm, e.g. in the range of 1 mm to 3 mm, such about 2 mm. When the material thickness of the inner tubing material is in the range of 1 mm to 10 mm, especially 1 mm to 3 mm, the device can be made compact.

In general, the inner tubing has an "active length", which corresponds to the section of the inner tubing in which the fission reaction takes place. Any part of the inner tubing thus not contained in the core is typically not excluded from the active length. The inner tubing may contain sections of corundum tubes, or the inner tubing may contain sections prepared from sheets of corundum joined together. In an embodiment, the inner tubing comprises a section consisting of corundum. In the context of the invention, a "section" is a length of the inner tubing material so that a section of the inner tubing consisting of corundum is a single piece of corundum, in particular, the single piece may be a tube of corundum. When the inner tubing has a section, especially a single tube, the surface area of structural material other than the corundum can be minimised. In an embodiment, the single tube of corundum is as long as possible, e.g. with a length, e.g. the active length, up to 3 m, e.g. 2 m, and the diameter of the single tube may for example be in the range of 1 mm to 20 mm. In another embodiment, the single tube of corundum has a length, especially an active length, up to 1 m, and the diameter of the single tube may for example be in the range of 1 mm to 20 mm. The material thickness of the single tube may be in the range of 1 mm to 10 mm.

Individual sections, e.g. single tubes, of corundum may be joined together using any approach as desired. Tubes joined together may be of the same material or tubes of different materials may be joined together. For example, two tubes of corundum may be joined together, or a tube of corundum may be joined with a tube of another material, e.g. a Hastelloy. For example, individual tubes may be joined together at the end, e.g. to form a so-called "butt joint", or a first tube, e.g. an "internal tube", having an outer diameter smaller than the inner diameter of a second tube e.g. an "outer tube", may be inserted into the second tube, e.g. to form a so-called "lap joint". In an embodiment the butt joining and the lap joining are combined. For example, a short section, i.e. an internal tube, e.g. of a corundum, having a small outer diameter may be inserted into the ends of two separate tubes, i.e. outer tubes, e.g. corundum tubes, having an inner diameter larger than the outer diameter of the internal tube. The outer tubes may be pushed together or there may be a distance between the ends of the outer tubes. In a lap joint the outer diameter of the internal tube may be substantially the same as the inner diameter of the outer tube in order to secure tight, e.g. fluid tight, coupling between the two tubes.

In an embodiment, two tubes are lap joined or butt joined, and a metal is located at the junction to further ensure fluid tight connection between the two tubes. The metal at the junction, whether a lap joint or a butt joint, may take the form of a ferrule or fitting. A ferrule or fitting may comprise, e.g. be made of, a ductile, and preferably also corrosion resistant, metal. Relevant metals for a ferrule or fitting are nickel, nickel alloys, e.g. Hastelloy, and gold. For example, the ferrule or fitting can be made of nickel, nickel alloys and/or gold, or any of these metals may be included in the ferrule or fitting. A ferrule or fitting will have a first end with an inner diameter larger than the outer diameter of the internal tube and a second end with an outer diameter smaller than the inner diameter of the outer tube. The first and the second end of the ferrule or fitting may be the same, e.g. the ferrule or fitting is cylindrical, or the first and the second end of the ferrule or fitting may be different, e.g. the ferrule or fitting is frustoconical. The metal at the junction may also be applied in a molten state or be molten after application before joining the two tubes. Joining two tubes using a molten metal may also be referred to as "brazing". Appropriate metals for brazing comprise Pt—Cu—Ti, Pd—Ni—Ti, and Co—Ti.

The inner tubing of the device of the invention may also comprise metallic sections consisting of a metal selected from the list consisting of nickel based superalloys, e.g. Hastelloy N, or nickel etc. Metallic sections may be joined together or joined with sections of corundum using lap joining or butt joining as described above, and the joints may employ metallic ferrules or fittings or the tubes may be joined by brazing. Metallic sections advantageously allow a more flexible layout of the inner tubing. For example, the inner tubing may comprise corners, turns, reducers or the like of metallic sections. In a preferred embodiment, straight sections of the inner tubing, especially inner tubing located in the core container, consist of tubes of corundum, and corners and/or turns of the inner tubing consist of metallic sections. For example, corundum tubes, i.e. the section or sections of the inner tubing consisting of single crystal corundum, may constitute 70% to 90% of the total length of the inner tubing. In a particular embodiment, the corundum tubes constitute 100% of the active length of the inner tubing. Thereby, the neutron transparency of the corundum is used optimally allowing the design and operation of fast reactors and thermal/epithermal reactors alike.

The inner tubing has an inner surface and an outer surface. Either surface or both surfaces of the inner tubing may be coated with nickel or a nickel alloy, e.g. Hastelloy. Coating with the nickel alloy or nickel provides an extra level of protection from corrosion caused by the molten salts. The nickel or nickel alloy is especially relevant on the outer surface of the inner tubing when the inner tubing contains the fuel salt and when a molten moderator salt, e.g. a molten moderator salt comprising at least one metal hydroxide, at least one metal deuteroxide or a combination thereof, is contained in the core container. The coating may have a thickness in the range of 1 μm to 100 μm. A coating thickness of 1 μm is considered sufficient for the coating to provide protection from corrosion. Thicknesses above 100 μm may, however, have a negative effect on neutron economy so that the thickness should not be above 100 μm.

The device of the invention has a core container, and the volume, size and shape of the core container may be chosen freely. In general, the core container has an internal volume, which corresponds to the total volume of the core container minus the volume of the inner tubing. The core container may be upwards open although the core container typically comprises a lid or cover. In general, the total volume of the core container is sufficient to contain the inner tubing. However, the inner tubing need not be fully contained within the core container and sections of the inner tubing may extend outside the core container. In an embodiment, the inner tubing has a volume in the range of 10% to 90% of the total volume of the core container. When the volume of the inner tubing is in the range of 10% to 90% of the total volume of the core container, the inner tubing may be fully contained within the total core volume.

The core container has an inner surface facing the inner tubing. Thus, when the core container contains molten salt, e.g. a fuel salt, a moderator salt, a coolant salt, etc. the molten salt will be in contact with the inner surface of the core container and the outer surface of the inner tubing. The core container is made of a core container material. Any appropriate material may be selected for the core container material. In an embodiment, the core container material is a nickel based alloy, e.g. a Hastelloy. In the context of the invention a nickel based alloy is an alloy having at least 50% nickel. In another embodiment, the core container material is of stainless steel or another metal or alloy, the inner surface of which is coated with a nickel or a nickel alloy, e.g. Hastelloy. For example, the inner surface may have a coating with a thickness in the range of 1 μm to 100 μm. In a further embodiment, the inner surface of the core container, e.g. with the core container material being nickel or a nickel alloy, is clad with corundum, e.g. in the form of sheets.

The device of the invention may be a fast, i.e. unmoderated, or a thermal or epithermal, i.e. moderated, MSR. When the device of the invention comprises a moderator, any moderator may be used. In an embodiment the inner tubing has an inlet and an outlet and contains the fuel salt, and the moderator may be solid, e.g. graphite, or the moderator may be a liquid, e.g. a molten moderator salt.

In other embodiments, the moderator is a molten moderator salt, and either the molten moderator salt or the fuel salt may be circulated. For example, the molten moderator salt may be in the core container having an inlet and an outlet, which inlet and outlet are part of a closed loop with a heat exchanger so that the molten moderator salt can be circulated to transfer heat in the heat exchanger and drive a turbine and at the same time cool the molten fuel salt in the inner tubing to retain criticality. Alternatively, the inner tubing has an inlet and an outlet, which inlet and outlet are part of a closed loop with a heat exchanger, and the molten moderator salt is in the inner tubing for circulating in the heat exchanger and retain criticality of the molten fuel salt in the core container. The device of the invention may be used with any number of heat exchangers as appropriate to the specific set-up.

In yet a further embodiment, both the inner tubing and the core container have an inlet and an outlet and either, or both, may form closed loops with a heat exchanger, e.g. the system comprises two heat exchangers. In a specific embodiment, the inner tubing and the core container have an inlet and an outlet. The fuel salt may be contained in the inner tubing, and the core container contains a salt comprising at least a fissionable material, e.g. $^{232}$Th, $^{233}$U, $^{235}$U, $^{239}$Pu, and $^{238}$U, so that neutron radiation created in the critical fuel salt will convert fissile material into fissionable material.

Any embodiment of the invention that employs a molten moderator salt may use any molten moderator salt disclosed in WO 2018/229265. For example, the moderator salt may comprise at least one metal hydroxide, at least one metal deuteroxide or a combination thereof and a redox-element selected from the group consisting of Sr, Ca, Li, Rb, K, Ba, Li$_2$C$_2$, Na, Mg, Th, U, Be, Al or Zr or combinations thereof. The metal hydroxide or metal deuteroxide may be anhydrous or may contain up to 10% (w/w) water, e.g. 5% (w/w) water. The addition of water, e.g. up to 5% (w/w), strengthens the effect obtained by addition of the redox-element and moreover, the presence of water in the salt may further increase the moderating effect.

The presence of water in a salt will contribute to the "oxoacidity" of the molten salt. In molten salts containing hydroxides, the hydroxide ion is an amphoteric species, which can accept a proton to become H$_2$O as well as donate a proton to become the superoxide ion O$^{2-}$. Water present in the molten salt reacts by the following equations The oxoacidity is defined pH$_2$O=$-\log_{10}$[H$_2$O] and the oxobasicity is pO$^{2-}$=$-\log_{10}$[O$^2$], much like the well-known definition of pH=$-\log_{10}$[H$^+$].

The oxoacidity may aid in predicting the stability of certain species in molten salts as it is described by B. L. Trémilion in Chemistry in Non-Aqueous Solvents, Springer Netherlands, Dordrecht, 1974. doi:10.1007/978-94-010-2123-4 and in Acid-Base Effects in Molten Electrolytes, in: Molten Salt Chemistry, 1987: pp. 279-303 (which are hereby incorporated by reference). For example, alumina is slightly soluble in acidic and neutral melts, and is very soluble in basic melts. In acidic melts it dissolves as AlO$^+$, and in basic melts it dissolves as AlO$_2^-$. However, Trémillon notes that the combination of an oxidised species with a base stabilises the system, which explains why easily oxidised species are more stable in basic media. Conversely, oxidised species are generally much less stable in an acidic system where the base is easily combined with the acidic species, and as a result the reduced species is favoured. However, for Al$_2$O$_3$ there is a range of oxoacidities where Al$_2$O$_3$ can exist in stable equilibrium with a solution of either AlO$^+$ or AlO$_2^-$ at oxoacidic/oxobasic conditions. For example, the equilibrium curves for Al$_2$O$_3$ in a diagram indicating the presence of the ions AlO+ and AlO$_2^-$ as a function of the pH$_2$O will show that at pH$_2$O=2.6 the equilibrium concentration [AlO$^+$]=[AlO$_2^-$]=10$^{-6.7}$ M equal to 0.2*10$^{-6}$ M. This therefore represents the minimum concentration of aluminium species AlO+ and AlO$_2^-$ present in equilibrium with Al$_2$O$_3$. In general, solute concentrations below 10$^{-6}$ M are considered stable with respect to corrosion, and thus there exists a range of water concentrations in a molten hydroxide where Al$_2$O$_3$ is sufficiently stable to be used as a structural material. In a particular embodiment, the device of the invention is used with a molten moderator salt comprising a metal hydroxide and/or a metal deuteroxide, e.g. the metal may be sodium or potassium or a combination of sodium and potassium, and water at a concentration to provide a $pH_2O$ in the range of 2.2 to 3.0. When water is present in this range, there is no need to supplement the molten moderator salt with a redox-element as defined above. In an embodiment, the device is used with the molten moderator salt not comprising a redox-element, especially a redox-element selected from the group consisting of Sr, Ca, Li, Rb, K, Ba, $Li_2C_2$, Na, Mg, Th, U, Be, Al or Zr or combinations thereof.

In certain embodiments, different types of moderators are not used together. For example, in an embodiment the moderator is a molten salt comprise a metal hydroxide and/or a metal deuteroxide as the moderator. In this embodiment, it is preferred that graphite is not used as a moderator. In another embodiment, graphite is used as a moderator, and a molten metal hydroxide/metal deuteroxide salt is not used as a moderator.

In an embodiment the inner tubing has an inlet and an outlet. In particular, the inner tubing may contain angles or curved sections as appropriate for the inner tubing of the desired length to fit within the core container. For example, the inner tubing may contain a meander structure, e.g. a meander structure having a single inlet and a single outlet. A meander structure may be planar, or it may extend in three dimensions. In another embodiment the inlet of the inner tubing comprises a manifold dividing the flow from the inlet into a number of tubes, e.g. 2 to 1000 or more tubes, which may be spaced, e.g. regularly spaced, in the core container. In an embodiment, the core container comprises a single inner tubing having a meander structure so that the core container contains 2 to 1000 or more sections of the single inner tubing. The core container may also comprise more than one inner tubing having a meander structure so that the core container contains 2 to 1000 or more sections of the two meanders. Likewise, the inner tubing may have an outlet with a manifold collecting the flow from a plurality of tubes, e.g. 2 to 1000, into a single outlet tube. In an embodiment the inner tubing has a single inlet and a single outlet, and the inner tube forms a meander extending the three dimensions and providing a regular distance between the sections of the inner tubing. The core container may thus comprise a plurality of sections of inner tubing. Regardless of the design on the inner tubing, e.g. whether the inner tubing comprises a manifold or whether the inner tubing has a meander structure, or whether the inner tubing comprises a manifold and also has a meander structure, the distance between the tubes or the sections of the inner tubing will be in the range of 0.5 cm to 10 cm. For example, when the molten fuel salt has 2 cmol % fuel, the distance will be in the range of 1 cm to 3 cm. When the molten fuel salt has 4 cmol % fuel, the distance will be in the range of 0.5 cm to 6 cm. Correspondingly, the distance between the inner tubes may be in the range of 0.5 cm to 10 cm. In general, when the molten fuel salt is contained in the inner tubing, the diameter of the inner tubes is correlated with the distance between the inner tubes, which is also influenced by the specific choice of the moderator. The diameter of the inner tubes and the distance between them may be calculated by the skilled person.

The containers, e.g. the inner tubing and the core container, may have any shape as desired. For example, the container for the fuel salt, whether the inner tubing or the core container, may have an inlet and an outlet allowing a flow of the fuel salt from the inlet to the outlet. Likewise, the core container may also have an inlet and an outlet. In another embodiment the core container with the moderator material has an opening serving both as an inlet and an outlet.

In embodiments of the invention, the inner tubing contains the fuel salt and the inner tubing does not have an inlet nor an outlet. In this embodiment it is preferred that the inner tubing is made from corundum, e.g. the inner tubing consists of a corundum tube closed at a bottom, and the fuel salt, e.g. 72% $^7LiF$, 16% $BeF_2$, 12% $AnF_4$, or 60% NaCl, 40% $AnCl_3$ with "An" corresponding to 24% U and 16% Pu, is introduced into the corundum tube, which is closed at its top to contain the fuel salt to provide a "fuel pin". Any number, e.g. in the range of 1 to 1000, of such fuel pins may be introduced into the core container, which has an inlet and an outlet for a molten salt. The molten salt in the core container may be a moderator salt, i.e. the device is a thermal or epithermal MSR, or a coolant salt, i.e. the device is a fast MSR. Any molten moderator salt of WO 2018/229265 may be used. Any non-moderating coolant salt may be used in the fast reactor.

In an embodiment the device is a fast reactor and the inner tubing, which has an inlet and an outlet, contains the molten fuel salt. The inner tubing is comprised in the core container, which comprises a gas, which may be a noble gas, in particular helium, or carbon dioxide, or a mixture of helium and carbon dioxide. The core container may have an inlet and an outlet, e.g. for circulating the gas, although it is preferred that the core container in this embodiment does not have an inlet or an outlet. It is to be understood that the core container will have the necessary openings for filling the core container with the noble gas. In this embodiment, corundum structures, e.g. tubes, will function as flow guides along which the molten fuel salt of the fast reactor core can flow. This eliminates concerns in alternative molten salt fast reactor designs where large and open volumes of fuel salt lead to complex and detrimental flow patterns, e.g. stagnant recirculation zones and turbulence-induced high-frequency power variation. Thus, the present invention provides a simplified and safer set-up for performing a molten salt fast reactor.

In a further embodiment the device is a moderated reactor, and the inner tubing, which has an inlet and an outlet, contains the molten fuel salt. In this embodiment, the core container contains a solid moderator, e.g. graphite. The inner tubing will be connected, i.e. be in fluid communication with, a heat exchanger. In particular, the inner tubing and the heat exchanger provides a closed loop for circulating the molten fuel salt to transfer heat and drive a turbine and at the same time cool the molten fuel salt to retain criticality. The corundum of the inner tubing minimises corrosion of the system and by using the corundum together with a solid moderator the longevity of the system is increased.

In a further aspect, the invention relates to a method of controlling a nuclear fission process, the method comprising the steps of providing a device according to any embodiment of the device aspect of the invention, the core container of the device having the inlet and the outlet; introducing a molten fuel salt into the inner tubing, which molten fuel salt comprises halides of an alkali metal and a fissile element; introducing into the core container a molten coolant salt; providing a heat exchanger in fluid communication with the inlet and the outlet of the core container so as to define a heat exchange loop for removing heat from the coolant salt circulating in the heat exchange loop; and circulating the coolant salt in the heat exchange loop so as to control the temperature of the fuel salt in the inner tubing.

In a further aspect of the method of controlling a nuclear fission process, the method comprising the steps of providing a device according to any embodiment of the device aspect of the invention, the inner tubing of the device having the inlet and the outlet; introducing a molten fuel salt into the inner tubing, which molten fuel salt comprises halides of an alkali metal and a fissile element; providing a heat exchanger in fluid communication with the inlet and the outlet of the inner tubing so as to define a heat exchange loop for removing heat from the molten fuel salt circulating in the heat exchange loop; and circulating the molten fuel salt in the heat exchange loop so as to control the temperature of the fuel salt.

In both method aspects, the halide may be a fluoride, e.g. for a moderated reactor, or a chloride salt, e.g. for a fast reactor. The coolant salt may thus comprise a moderator.

In a specific embodiment, the core container contains a blanket of breeder material. The breeder material may have any composition allowing the material to be converted to be a nuclear fuel. For example, the breeder material may contain $^{238}$U that can be converted to $^{239}$Pu or $^{232}$Th that can be converted to $^{233}$U upon neutron irradiation. In particular, the blanket may be located outside the core or the blanket may be at the periphery of the core. In both cases the blanket will capture neutrons and thereby produce further fissile material. The fissile material is hereafter transferred to the critical core.

Nuclear fission in the fuel salt will create heat and it is preferred that the device also comprises a heat exchange system for transporting the heat away from the fuel salt container, e.g. to a turbine or the like for generation of electricity. In particular, if heat is not removed from the molten fuel salt, the molten fuel salt will expand to a point where the nuclear fission reaction will stop. Thus, in the method aspects of the invention the nuclear fission processes are controlled by controlling the temperature of the fuel salt in the inner tubing or in the core container so as to maintain the temperature within the critical temperature range for the respective fuel salt. Any heat exchange system may be chosen for the device. In general, the temperature of the molten fuel salt is in the range of 700° C. to 900° C., e.g. for the nuclear reaction to take place, and the coolant is chosen to work at a temperature in the range of 500° C. to 1000° C. or more. In a specific embodiment the temperature at the inlet is in the range of 400° C. to 800° C., and wherein the temperature at the outlet is in the range of 600° C. to 1000° C. Evidently the temperature at the inlet is lower than the temperature at the outlet. In a preferred embodiment the fuel salt is circulated, e.g. from the inner tubing, to the heat exchange system to cool the fuel salts. In another embodiment, a molten moderator salt is located in the inner tubing and circulated to the heat exchanger so that the moderator salt in turn cools the molten fuel salt to maintain this within the critical temperature.

In yet a further embodiment, the device comprises a separate coolant loop with a molten coolant salt. It is also contemplated that a molten metal, e.g. an alkali metal, may be used as a coolant. The heat exchange system may thus comprise a coolant loop in thermal contact with the molten fuel salt, allowing transfer of heat from the fuel salt to the coolant salt. Any salt may be chosen for the coolant salt. In a specific embodiment the coolant is a salt of the composition 46.5% LiF, 11.5% NaF and 42% KF (FLiNaK), although the composition may also be varied. The coolant loop has an inlet for low temperature coolant and an outlet for heated coolant.

A nuclear fission reactor may be described in terms of its power density (P), which refers to the (average) amount of heat produced in the in-core fuel salt per unit volume-time due to nuclear fissions and radioactive decays. When the neutron population in the reactor remains steady from one generation to the next (creating as many new neutrons as are lost), the fission chain reaction is self-sustaining and the reactor's condition is referred to as "critical". Since heat production in an MSR is chain-reaction driven and because no solid fuel is present in the reactor core, the upper theoretical limit on the power density is very high, this being much higher than would be desired during normal operation. Power density can therefore be considered to be a design choice rather than a design feature. The reactor core power density depends on the circulation time, residence fraction, physical properties of the fuel salt and finally on the inlet/outlet temperature difference. A figure of merit for the fuel salt power density in an MSR is given by:

$$\mathbb{P} = \frac{c_{fuel}\rho_{fuel}\Delta T}{f\tau_c}$$

where f is the fuel residence time fraction, $\tau_c$ is the circulation time, $c_{fuel}$ and $\rho_{fuel}$ are the specific heat capacity and the density, respectively, of the molten fuel salt, and $\Delta T$ is the difference between in inlet temperature and the outlet temperature.

As a general rule, higher power densities enable a smaller core volume. However, for a given power output and core volume, the power density should be kept as small as possible to reduce residual heat production from decay products, as well as radiation damage to the core, which reduces the life-time of the reactor. Settling on a specific fuel power density is therefore a trade-off between minimising the core volume and maximising reactor control and life-time.

In a further embodiment the reactor core further comprises a coolant and/or a reflector that may be different from the moderator material, if present. A preferred reflector material is graphite or beryllium. Thereby, a device is provided in which the moderator material may easily, and with a simple reactor structure, be kept stationary, and the corrosive effects of a molten moderator salt may easily be controlled with a simple reactor structure.

The device according to the invention is a molten salt reactor. The molten salt reactor according to the invention may be a molten salt reactor of the burner type or a molten salt reactor of the waste burner type. The molten salt reactor according to the invention may be a molten salt reactor of the breeder type, the breed-and-burn type or the MSR type. In an embodiment, the molten salt reactor may be for supplying energy for propulsion of means of transportation, e.g. the molten salt reactor may be carried on a ship. In another embodiment the molten salt reactor is part of a fixed installation.

Any embodiment of the two method aspects may generally take place in any embodiment of the device of the invention. Likewise, any embodiment of the use aspect of the invention may be performed in any embodiment of the device of the invention. However, the use aspect is not limited to the device of the invention, and the use may be performed in any appropriate reactor as desired.

It is noted that the invention relates to all possible combinations of features recited in the claims. In particular, any feature mentioned in the context of a specific aspect of the invention is equally relevant for any other aspect of the invention where it provides the same advantage as for the aspect where it is mentioned explicitly.

BRIEF DESCRIPTION OF THE FIGURES

In the following the invention will be explained in greater detail with the aid of an example and with reference to the schematic drawings, in which.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Fuel Salt Composition

The fuel salt (abbreviated FS) in general consists of a non-actinide carrier part (chosen for its thermodynamic properties), and an actinide component ensuring reactor criticality. The actinide component $An_i$ may further be split up in a fuel component and an added fertile component. The fuel salt vector $F_i$ is described by a pre-defined fuel vector which contains an initial plutonium component (typically Spent Nuclear Fuel (SNF) i.e. nuclear waste) along with additional components (some added after chemical reprocessing). The added (fertile) part is defined by the vector $A_i$ which is chosen from its role in the reactor burnup process and will typically consist of added thorium and uranium. The actinide composition is defined by the various fuel vectors and is captured by the following values of merit:

$F_{Pu}$ the fuel plutonium (cation mole) fraction;

$A_{Th}$ the fuel thorium (cation mole) fraction of the added fertile vector;

$F_A$ the added (fertile) (cation mole) fraction.

Here the two first fractions refer to the cation mole fractions of the fuel vector and the added fertile vector, respectively. The fuel salt is defined by the various fuel vectors, a carrier salt vector $CS_i$, along with the following values of merit for the fuel salt:

$FS_{Pu}$ the fuel salt plutonium (cation mole) fraction;

$FS_{Th}$ the fuel salt thorium (cation mole) fraction;

$FS_{CS}$ the carrier salt (cation mole) fraction.

Here "fraction" refers to the cation mole fraction of the combined fuel salt. With these definitions, the fuel salt vector can be written: $(FS)_i = FS_{CS} CS_i + (1-FS_{CS}) An_i$. The actinide vector is split up according to: $An_i = (1-F_A) F_i + F_A A_i$.

Here $F_{Pu}$ of $F_i$ consists of plutonium isotopes and $A_{Th}$ of $A_i$ consists of thorium. We note that the following relations exist between the salt parameters:

$$FS_{Pu} = (1-FS_{CS})(1-F_A)F_{Pu}; FS_{Th} = (1-FS_{CS})F_A \cdot A_{Th}$$

An exemplary fuel salt contains the following fuel salt vectors: $CS_i$ =NaF; $A_i$=ThF$_4$. This fuel is summarised in Table 3.

TABLE 3

A preferred fuel salt composition

| Fraction | cmol % | Motivation |
|---|---|---|
| $FS_{CS}$ | 78 | Eutectic point |
| $F_{Pu}$ | 80 | Chemical reprocessing |
| f$^{238}$U | 97.5 | Chemical reprocessing |
| $A_{Th}$ | 100 | Waste burning |
| $F_A$ | ≈90 | Optimization study |
| f$^{238}$Pu | 0.5 | Industry waste standard |
| f$^{239}$Pu | 69 | Industry waste standard |
| f$^{240}$Pu | 25 | Industry waste standard |
| f$^{241}$Pu | 2 | Industry waste standard |
| f$^{242}$Pu | 1 | Industry waste standard |
| f$^{241}$Am | 2.5 | Industry waste standard |
| $S_{Pu}$ | ≈2 | — |
| $S_{Th}$ | ≈20 | — |

Preferred Device Of The Invention

Figure 4:
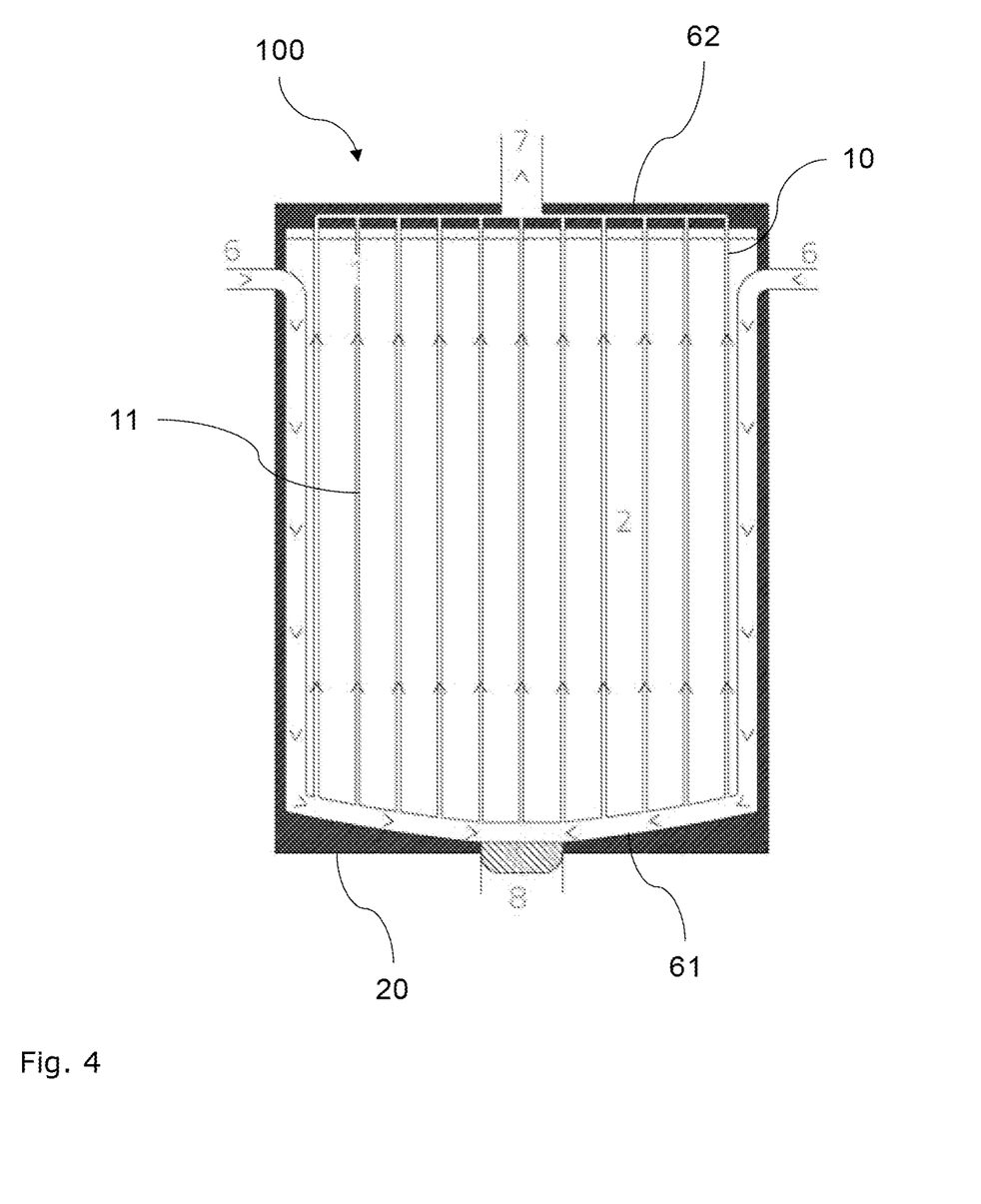
FIG. 4 shows a side view of a device of the invention.
Figure 5:
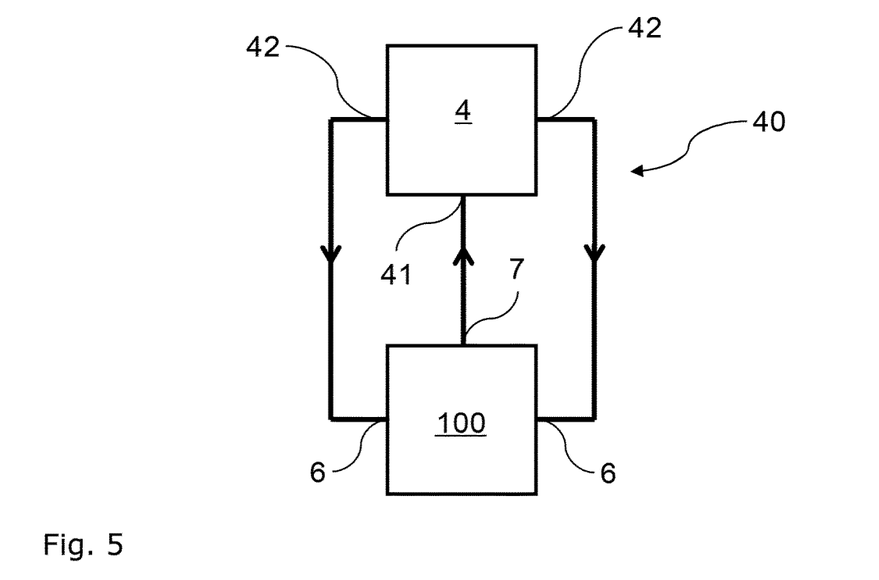
FIG. 5 shows the device of the invention connected to a heat exchanger.

A preferred device 100 of the invention is illustrated in FIG. 4, where it is depicted from the side. Specifically, FIG. 4 shows the device 100, which has a core container 20, which core container 20 encloses an inner tubing 10 with a molten fuel salt 1. The core container 20 has a total volume, and the total volume of the core container minus the inner tubing 10 represents the internal volume 2. The internal volume 2 may contain a molten moderator salt, a molten coolant salt, a graphite moderator or a noble gas. The inner tubing has one or more, e.g. two as depicted in FIG. 4, inlets 6 in fluid communication with an inlet manifold 61, which in turn is in fluid communication with the inner tubing 10. The inner tubing 10 communicates with an outlet manifold 62, which collects the flow, in this case of molten fuel salt 1 in a single outlet 7. The direction of the flow is indicated with the symbol ">". The device 100 may be connected to a heat exchanger 4 for eventually converting heat generated from the fission reaction into electricity as illustrated schematically as a "black box" model in FIG. 5. The inlets 6 and the outlet 7 are in fluid communication with an inlet 41 and an outlet 42, respectively, of a heat exchanger 4 to provide a heat exchange loop 40. The details of the heat exchanger 4 are not shown in FIG. 5. The core container material is a nickel based alloy, specifically a Hastealloy. The inner tubing 10 comprises sections 11 of tubes of corundum and sections 11 of tubes made from a nickel based alloy. Any straight section 11 of the inner tubing 10 may be a corundum tube and in the embodiment shown, the sections 11 with angles are made from tubes of Hastelloy. The tubes of the different sections 11 are lap joined together.

The device 100 may further comprise an additional safety feature 8 comprising an overflow system in addition to the commonly used salt plug system of the prior art. This safety system prevents meltdowns, hinders accidents from human operator error, automatically shuts down in case of out of scope operation conditions, and may flush the fuel inventory to a passively cooled and sub-critical dump tank below the core vessel in case of a loss of operation power.

The reactor size is determined from two conditions; circulation time and negative temperature feedback for both fuel and moderator. In practice the operating power density can be adjusted through physical feedback mechanisms in the reactor core. In particular, the negative temperature feedback of both the fuel salt and the moderator means that the power density can be controlled by adjusting the external energy in-flow. Since core circulation may carry delayed neutrons away from the chain reaction, the mass flow rate through the reactor core should be held constant for optimal reactor control and safety reasons. Rather than changing the internal core flow, it is more desirable to control the power production by varying the mass flow through the external heat exchanger 4. In order to attain maximal reactor control, the mass flow rate through the device 100 should be chosen so that the change in the reactor reactivity as compared to no circulation is as small as practically possible. In this way, in case of pump failure scenario, the concentration of decaying precursors in the reactor core will only be minimally larger than at normal operation.

Figure 6:
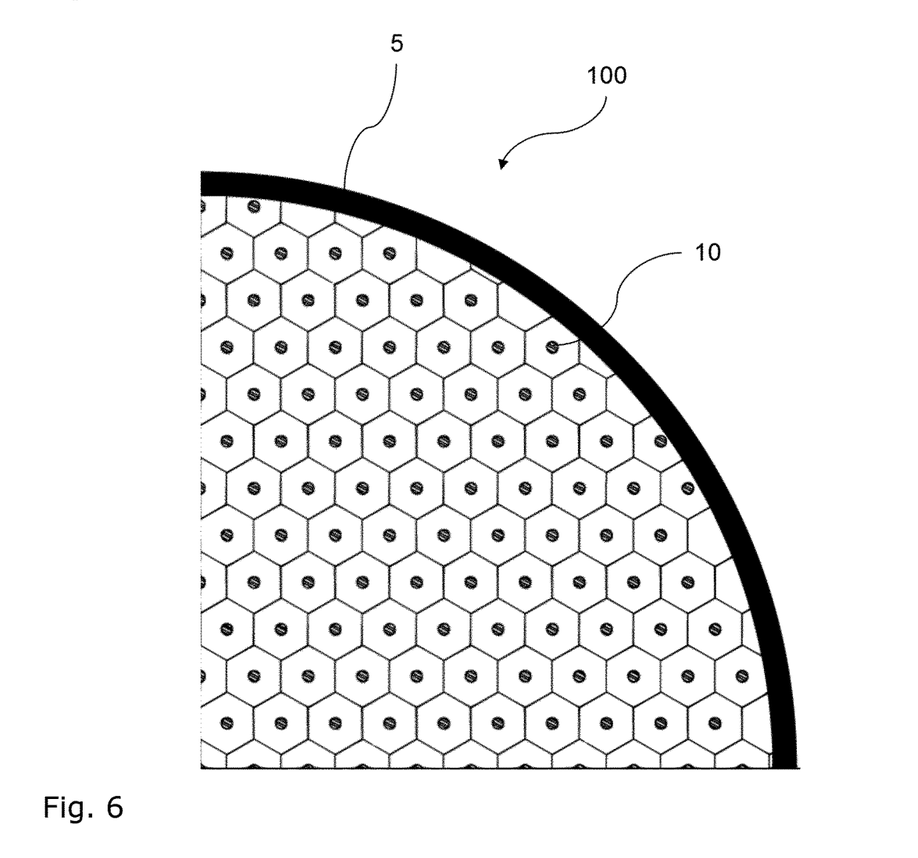
FIG. 6 shows a top view of a device of the invention.

FIG. 6 shows a top view of a section of the device 100 shown in FIG. 4. Thus, the inner tubing 10 is distributed in a hexagonal pattern in the core container, which has a cylindrical cross-section with an external cladding 5. The external cladding may also be referred to as a blanket or shielding. A hexagonal pattern is superimposed on the cross-section of the device 100, but this pattern is not intended to represent any specific material.

Figure 7:
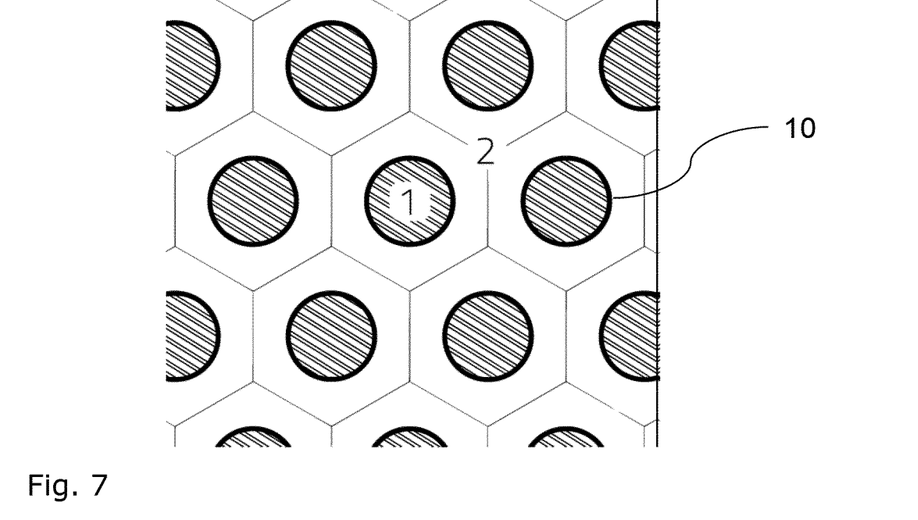
FIG. 7 shows a top view of detail of a device of the invention.
Figure 8:
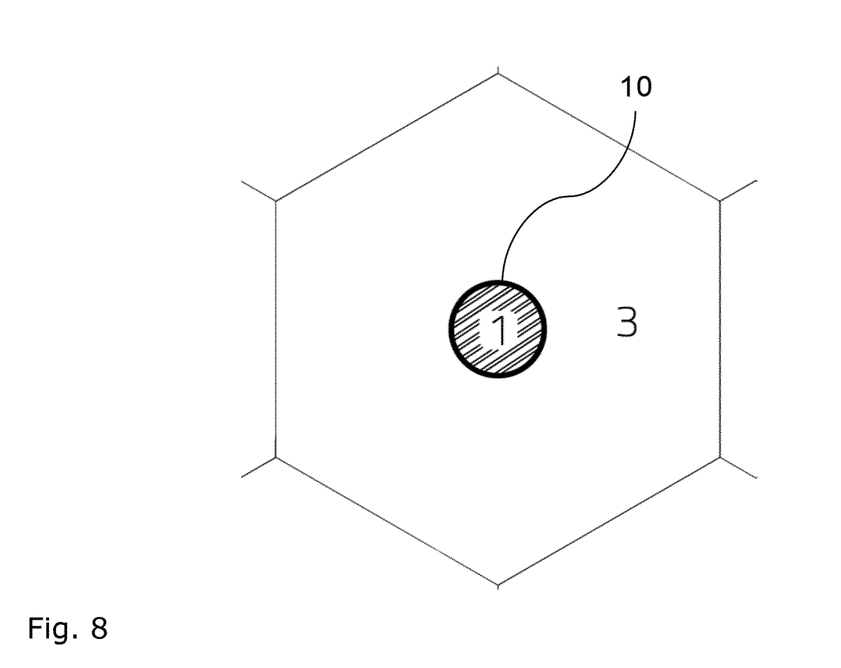
FIG. 8 shows a top view of detail of a prior art molten salt reactor.

FIG. 7 and FIG. 8 illustrate and compare the packing of the inner tubing 10 of a preferred device of the invention (FIG. 7) and a MSR (FIG. 8) where graphite 3 is used as a moderator. The superimposed hexagonal patterns show how a metal hydroxide/deuteroxide moderator allows a much denser packing of the inner tubing 10 than available in the graphite moderated MSR thus providing a much smaller form factor F.

EXAMPLE

Example 1

In order to test the stability of corundum in an appropriate molten salt, a sample of corundum was added to a molten FLiNaK salt (4.4 g LiF, 1.8 g NaF and 8.9 g KF) at 600° C. and kept in the molten FLiNaK salt for 25 hours. Prior to exposure to the molten salt the dry mass of the sample was recorded. The sample was removed from the molten salt, washed with water and dried in an oven and cooled to ambient temperature until a constant weight was obtained. The comparison of the mass of the sample before and after treatment showed a weight gain of 0.001 g (corresponding to 0.082% w/w or 0.3 mg/cm$^3$) was observed. Thus, no degradation of the corundum sample was observed.

Figure 1:
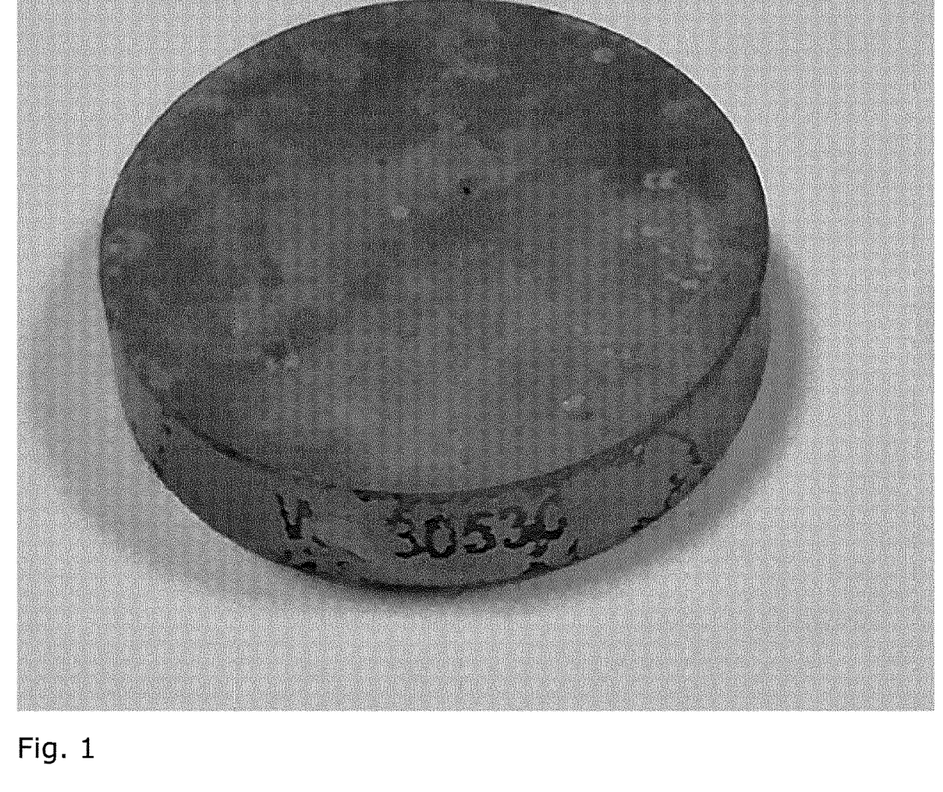
FIG. 1 shows a photomicrograph of the serial number in a sample of corundum exposed to a molten fluoride salt.

The corundum sample (in the form of a cylindrical slab of 12.1 mm diameter and 3 mm thickness) had a serial number engraved into the side of the sample, and after 25 hours in the molten FLiNaK that serial number was still clearly visible as is evident in FIG. 1.

Example 2

Model calculations for a device of the invention were made and compared to a device of the prior art based on Hastelloy N. The results are shown in FIG. 2 and FIG. 3. Specifically, the enrichment and the conversion ratios were calculated as functions of the inner tubing thicknesses for fuel salts of the composition 50.5% NaF 21.5% KF 28.0% UF$_4$ at criticality, where the structural material is Hastelloy N (prior art, left panels) and corundum (invention, right panels). The calculations show that both enrichment and conversion ratios are improved for the device of the invention, and furthermore in the device of the invention there is very limited effect of increasing the inner tubing thickness, which is in contrast to the prior art device where there is a pronounced negative effect of increasing the inner tubing thickness.

The invention claimed is:

1. A device adapted for producing energy by nuclear fission, the device comprising a core container of a core container material, which core container encloses an inner tubing of an inner tubing material, the inner tubing and/or the core container having an inlet and an outlet, the device further comprising a molten halide salt located in the core container or in the inner tubing, which inner tubing comprises at least one section consisting of single crystal corundum, wherein the device further comprises a moderator comprising at least one metal hydroxide, at least one metal deuteroxide or a combination thereof and water at a concentration to provide a pH$_2$O in the range of 2.2 to 3.0, which moderator is located in the core container and which molten halide salt is located in the inner tubing, or which moderator is located in the inner tubing and which molten halide salt is located in the core container.

2. The device according to claim 1, wherein the molten halide salt is a fuel salt, and the halide is fluoride.

3. The device according to claim 1, wherein the inner tubing does not have an inlet and an outlet.

4. The device according to claim 1, wherein the material thickness of the inner tubing material is in the range of 1 mm to 10 mm.

5. The device according to claim 1, wherein the at least one section of the inner tubing consisting of single crystal corundum constitutes 70% to 100% of a total length of the inner tubing.

6. The device according to claim 1, wherein a volume of the inner tubing is in the range of 10% to 90% of a total volume of the core container.

7. The device according to claim 1, wherein the inner tubing comprises a plurality of sections, which sections are spaced at a distance in the range of 0.5 cm to 10 cm.

8. The device according to claim 1, wherein the single crystal corundum is doped with a transition metal.

9. The device according to claim 1, wherein the inner tubing further comprises at least one metallic section consisting of a metal selected from the list consisting of nickel based superalloys, and nickel.

10. The device according to claim 9, wherein a section consisting of single crystal corundum and a metallic section are connected together by a butt joint or a lap joint mechanism.

11. The device according to claim 1, wherein two or more sections consisting of single crystal corundum are connected together by a butt joint or a lap joint mechanism.

12. The device according to claim 1, wherein the inner tubing is coated with nickel or with a nickel based superalloy.

13. The device according to claim 12, wherein the coating has a thickness in the range of 1 μm to 100 μm.

14. A method of controlling a nuclear fission process, the method comprising the steps of:
providing a device according to claim 1, the core container of the device having the inlet and the outlet, introducing a molten fuel salt into the inner tubing, which molten fuel salt comprises halides of an alkali metal and a fissile element, introducing into the core container a molten coolant salt, providing a heat exchanger in fluid communication with the inlet and the outlet of the core container so as to define a heat exchange loop for removing heat from the coolant salt circulating in the heat exchange loop, circulating the coolant salt in the heat exchange loop so as to control the temperature of the fuel salt in the inner tubing.

15. The method of controlling a nuclear fission process according to claim 14, wherein the core container contains a blanket of a breeder material.

16. The method of controlling a nuclear fission process according to claim 14, wherein the halide is fluoride.

17. A method of controlling a nuclear fission process, the method comprising the steps of:

providing a device according to claim 1, the inner tubing of the device having the inlet and the outlet, introducing a molten fuel salt into the inner tubing, which molten fuel salt comprises halides of an alkali metal and a fissile element, providing a heat exchanger in fluid communication with the inlet and the outlet of the inner tubing so as to define a heat exchange loop for removing heat from the molten fuel salt circulating in the heat exchange loop, circulating the molten fuel salt in the heat exchange loop so as to control the temperature of the fuel salt.

18. The method of controlling a nuclear fission process according to claim 17, wherein the halide is fluoride.

19. A device adapted for producing energy by nuclear fission, the device comprising a core container of a core container material, which core container encloses an inner tubing of an inner tubing material, the inner tubing and/or the core container having an inlet and an outlet, the device further comprising a molten halide salt located in the core container or in the inner tubing, which inner tubing comprises at least one section consisting of single crystal corundum and at least one metallic section consisting of a metal selected from the list consisting of nickel based superalloys and nickel.

20. The device according to claim 19, wherein the molten halide salt is a fuel salt, and the halide is fluoride.

21. The device according to claim 19, wherein the material thickness of the inner tubing material is in the range of 1 mm to 10 mm.

22. The device according to claim 19, wherein the at least one section of the inner tubing consisting of single crystal corundum constitutes 70% to 100% of a total length of the inner tubing.

23. The device according to claim 19, wherein a volume of the inner tubing is in the range of 10% to 90% of a total volume of the core container.

24. The device according to claim 19, wherein the inner tubing comprises a plurality of sections, which sections are spaced at a distance in the range of 0.5 cm to 10 cm.

25. The device according to claim 19, wherein the single crystal corundum is doped with a transition metal.

26. The device according to claim 19, wherein two or more sections consisting of single crystal corundum are connected together by a butt joint or a lap joint mechanism.

27. The device according to claim 19, wherein a section consisting of single crystal corundum and a metallic section are connected together by a butt joint or a lap joint mechanism.

28. The device according to claim 19, wherein the inner tubing is coated with nickel or with a nickel based superalloy.

29. The device according to claim 28, wherein the coating has a thickness in the range of 1 μm to 100 μm.

30. The device according to claim 19, wherein the device further comprises a molten moderator salt comprising at least one metal hydroxide, at least one metal deuteroxide or a combination thereof and water at a concentration to provide a pH2O in the range of 2.2 to 3.0.

31. The device according to claim 19, wherein the inner tubing does not have an inlet and an outlet.

* * * * *